United States Patent [19]

Szentesi

[11] Patent Number: 4,627,686
[45] Date of Patent: Dec. 9, 1986

[54] SPLICING TRAY FOR OPTICAL FIBERS

[75] Inventor: Otto I. Szentesi, Hickory, N.C.

[73] Assignee: Siecor Corporation, Hickory, N.C.

[21] Appl. No.: 639,585

[22] Filed: Aug. 10, 1984

[51] Int. Cl.⁴ .................................................. G02B 6/36
[52] U.S. Cl. .................................................. 350/96.20
[58] Field of Search ............... 350/96.15, 96.20, 96.21, 350/96.22

[56] References Cited

U.S. PATENT DOCUMENTS

| 4,266,853 | 5/1981 | Hutchins et al. | 350/96.20 |
| 4,319,951 | 3/1982 | Korbelak et al. | 350/96.21 X |
| 4,359,262 | 11/1982 | Dolan | 350/96.20 |

FOREIGN PATENT DOCUMENTS

| 0043570 | 1/1982 | European Pat. Off. | 350/96.20 |
| 3235723 | 3/1984 | Fed. Rep. of Germany | 350/96.20 |
| 2538918 | 7/1984 | France | 350/96.20 |
| 53-119059 | 10/1978 | Japan | 350/96.21 |
| 57-207213 | 12/1982 | Japan | 350/96.20 |

Primary Examiner—John Lee
Attorney, Agent, or Firm—Roy B. Moffitt

[57] ABSTRACT

A splicing tray for optical fibers and fiber optic cable comprising a base, optical fiber storage facilities disposed on the periphery of the base and an optical fiber receiving means attached to the base, the receiving means including a plurality of slots and a holding means, the slots formed by longitudinally upstanding sidewalls and the holding means, disposed along a terminal portion of the receiving means, having first and second communicating slots, the first slot having a transverse dimension larger than a like dimension of said second slot, both of said first and second slots of the holding means communicating with one of the first mentioned slots.

7 Claims, 6 Drawing Figures

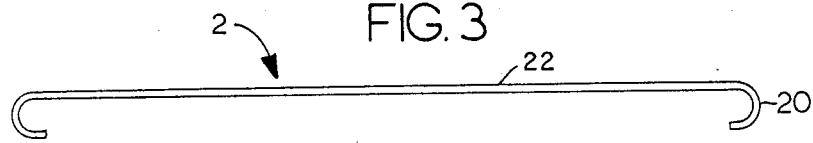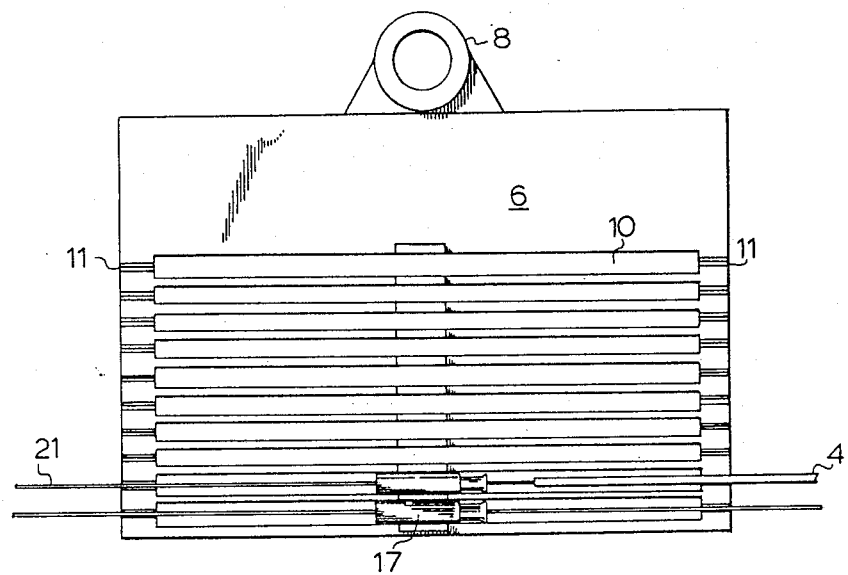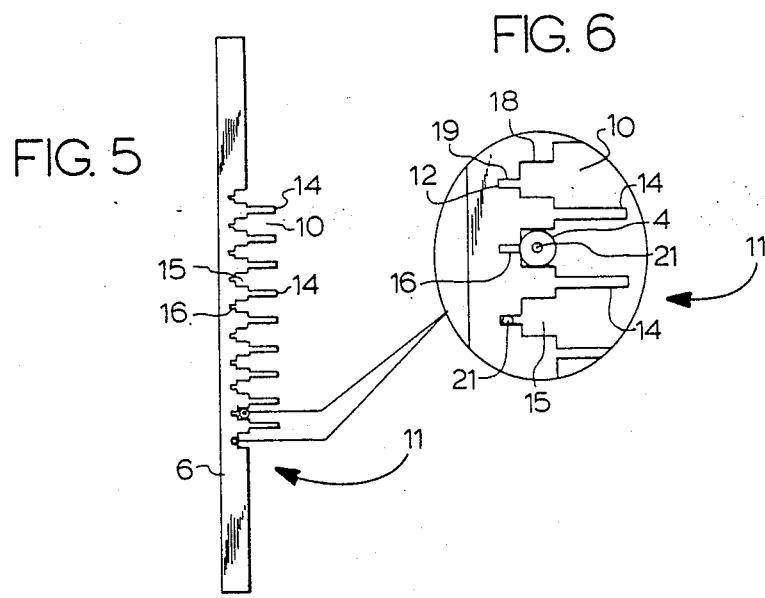

SPLICING TRAY FOR OPTICAL FIBERS

FIELD OF THE INVENTION

The invention is a splicing tray for optical fibers and/or optical cable, more particularly an enclosure into which optical cables containing one or more optical fibers can be terminated, its fibers spliced to fibers of other cables also terminated therein, all such fibers being removably anchored to a receiving means attached to the tray.

BACKGROUND OF THE INVENTION

In any communication system employing optical fibers, there is always a need to terminate a given fiber and splice it to another. Because there is also always a need to undo a given splice and create a new one, for one reason or other, there is also the need for storage space for storing excess optical fiber lengths, associated with a housing or enclosure used for splicing purposes. Sometimes optical fibers are used per se, or in a "loose tube fashion." In the tight buffered state, fibers per se or in the tight buffered mode have an outside diameter of one size. Other times optical fibers are disposed either singularly or plurally in plastic tubes, either loose or otherwise. The plastic tubes have an outside diameter larger than a fiber per se, buffered or not. Then again, one may want to terminte a fiber optic cable containing many fibers within an enclosure, splice its fibers to one or more cables having either a singular or plural fibers. The disclosed invention addresses these problems of number, size and storage with the solution that is simple, safe and effective.

SUMMARY OF THE INVENTION

The disclosed invention is a splicing tray for optical fibers and fiber optical cable, more particularly an enclosure made up of three elements: a base, a number of fiber optic storage means associated with the base and an optical fiber receiving means attached to the base. Around the periphery of the base is a plurality of upstanding sidewall members, the terminal portion of which is curved inwardly, towards the center of the base. A sidewall of this configuration (open channel) creates a storage means disposed on the periphery of the base, the storage means being used to store excess links of optical fiber or optical cable, whichever the case may be.

One or more fiber receiving means is attached to the base made up of several elements, namely: a plurality of slots and a holding means. The slots are delimited by longitudinally extending upstanding sidewalls and each one terminates with a holding means, disposed along the terminal portion of the receiving means. Each holding means is composed of a first and second communicating slots, the first slot having a transverse dimension larger than the like dimension of the second slot. Both of the first and second slots of the holding means communicate with one of the first mentioned slots.

BRIEF DESCRIPTION OF THE DRAWINGS

FIG. 3 is a side elevation of the cover means of FIG. 2.

FIG. 4 is an enlarged view of the receiving means 6 of FIG. 1.

FIG. 5 is a side elevation of part of the lateral terminal portion of receiving means 6.

FIG. 6 is an exploded portion of receiving means 6 as shown in FIG. 5.

DETAILED DESCRIPTION OF THE INVENTION

Figure 1:
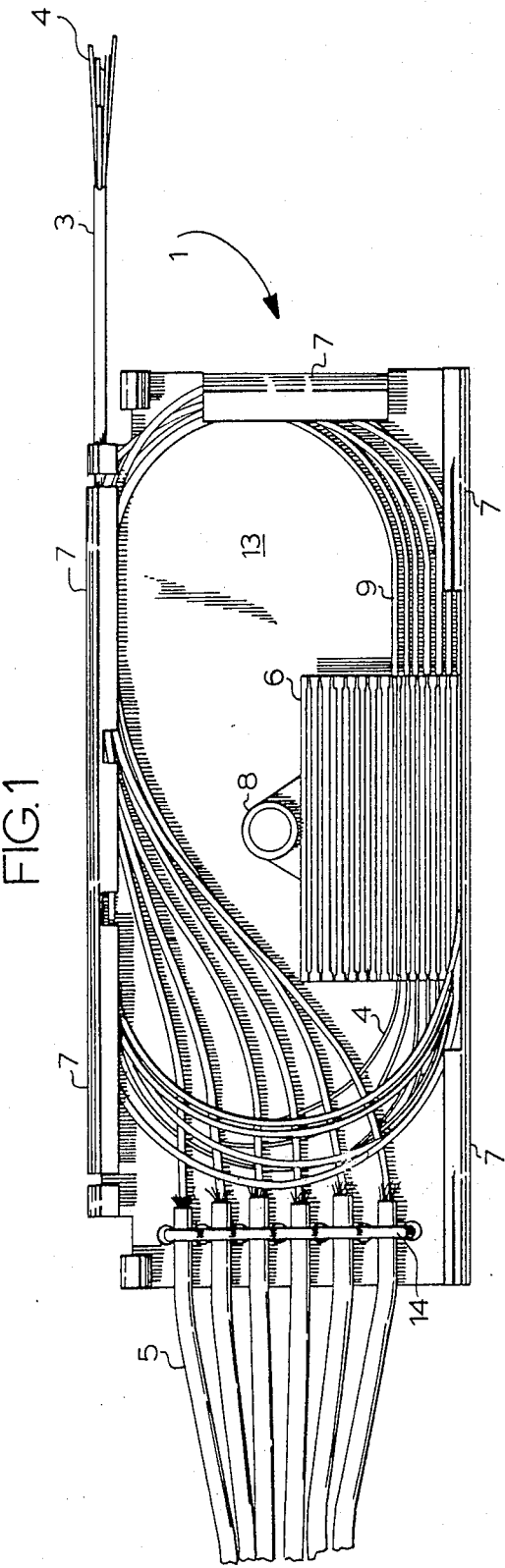
FIG. 1 is a plan view of the disclosed splicing tray, absent its cover means.
Figure 2:
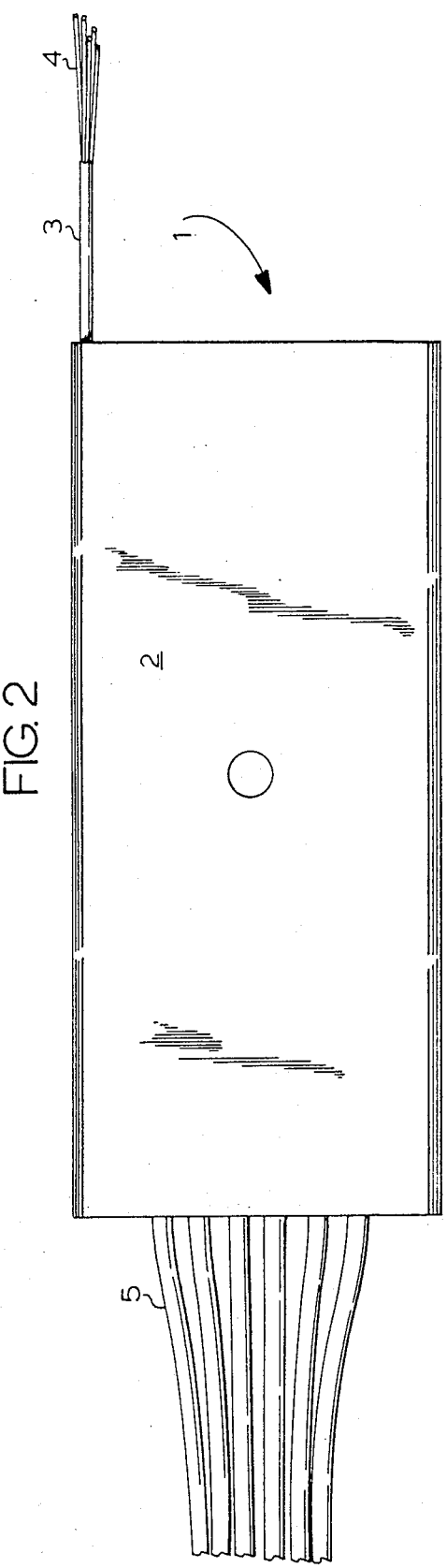
FIG. 2 is a plan view of the disclosed splicing tray of FIG. 1 with a cover means.

Shown by element 1 in FIGS. 1 and 2 is the splicing tray of the present invention. Tray 1 is made up of a base 13, generally composed of a flat piece of any conventional metal or plastic, and optical fiber storage facilities 7, which are formed by extending a portion of base 13 shown as terminal edges upwardly and then inwardly to form a curved wall around the portion so indicated by element 7 in FIG. 1. Attached to base 13 is optical fiber receiving means 6, any convenient means location indicated by element 8, which can be designed to act as a spacer means, i.e., a means to insure that cover 2 is spaced apart from base 13 and receiving means 6. Also attached to base 13 is holding means 14, for clamping to base 13 optical fiber cable 5. As shown by FIG. 1, optical cable 3 containing tubes 4, in which optical fibers are disposed, is brought into the splicing tray through storage means 7 and terminated as hereinafter described in receiving means 6. In like manner, fiber optic cable 5 containing tube 9, in which optical fiber(s) is/are disposed is brought into the tray, terminated by means 14, stored in storage means 7 and the optical fibers terminated in receiving means 6.

FIG. 2 shows the splicing tray 13 of FIG. 1 with cover 2 slideably and removably disposed over base 13. Referring to FIG. 3, the cover 2 is composed of a flat base 22, the terminal edges of which have been curved forward in a "U" shape to form element 20, much like that of element 7, such that it can be slideably disposed on the outside of element 7.

Receiving means 6 is shown in exploded view in FIG. 4 and is composed of slots 10 delimited by upstanding sidewalls 14. Each slot terminates on the lateral terminal portion of receiving means 6 with a holding means, indicated generally by element 11. Referring to FIGS. 5 and 6, one can get a better grasp of the details of holding means 11, which is basically made up of three communicating slots or chambers, namely slot 10, which communicates with slot 15, which communicates with slot 12. Slot 10 is delimited by sidewalls 14, slot 15 by sidewalls 18 and slot 12 by sidewalls 19.

Optical fiber 21, either per se or in the tight buffered state may be brought into the holding means and inserted into slot 12, which has a transverse dimension less than the transverse dimension of slot 15. If incoming fiber 21 is in a tube, such as tube 4, tube 4 then can be inserted into slot 15, the lateral dimension of which is much larger than the like dimension of slot 12. The lateral dimension of slot 10, delimited by sidewalls 14, is larger still than slot 15 so as to accommodate splicing means 17, which is a well known device that may be composed of plastic, glass or metal designed to align the optical fibers 21 of cables 5 or 3 into alignment so they abut one another to form a light transmission path. When such an alignment has been accomplished, the splice can be left per se or it can be encapsulated in some form of plastic, a technique well known in the art. Instead of using a plastic, glass or metal splicing means 17, one may fusion splice two abutting optical fibers outside of the tray using prior art fusion splicers and then place the fused optical fiber in receiving means 6 using slot 16 to anchor it. An encapsulate of some curable plastic (for example a silicone elastomer) is then used to encapsulate the fused together fibers by pouring the plastic over slots 10, 12 and 15 and allowing the plastic to cure.

Receiving means 6 is a device that can accommodate a few or many fibers, either in a tight buffered or in a loose tube configuration. It is further evident that a single or multiple cables having a plurality of fibers can be brought into the splicing tray terminated with the holding means 11, and then spliced to optical fibers in a cable like configuration or of a different configuration. Splices can be broken and reformed at will, there being plenty of room inside the splicing tray to store excess lengths of fiber or cable for just such purpose. The interior of the splicing tray is easily accessible and may be reached by sliding cover 2 either to the left or to the right to remove it or "popping it off" to expose the interior of the tray. Different sizes of fibers and tubes (elements 4 and 21) and mechanical splicing devices such as element 17, can be easily accommodated in slots 15, 12 and 10 respectively as shown. The lateral dimension of slots 10, 15 and 12 are such that the different elements designed to fit therein are snugly grasped by the sidewalls forming these slots, namely 14, 18 and 19 respectively, in such a manner that the item so inserted can be easily inserted and removed.

What is claimed is:

1. A splicing tray for optical fibers and fiber optic cable comprising:
   (a) a base;
   (b) optical fiber receiving means attached to the base including a slot having a median and two terminal portions, each of said terminal and median portions delimited by two upstanding sidewalls, only the sidewalls of the terminal portions having first, second and third portions, each of said first, second and third portions being spaced apart from and respectively paired opposite from a like first, second and third portion of an adjacent sidewall to form sidewall pairs delimiting first, second and third slots, all of such slots in communication with one another, all having predetermined bottoms and widths, the width of the first slot being less than the width of the second slot and the width of the second slot being less than the width of the third slot, the bottom of the first slot being spaced apart from the bottom of the second slot and the bottom of the second slot being spaced apart from the bottom of the third slot, the median portion of the first-mentioned slot being delimited only by opposing third portions of the sidewalls wherein each first slot is adapted to grasp a first buffered optical fiber when a buffered optical fiber is inserted therein and each second slot is adapted to grasp a second buffered optical fiber when a second buffered optical fiber is inserted therein, said second buffered optical fiber having an outer diameter greater than the outer diameter of said first buffered optical fiber.

2. A splicing tray for optical fibers and fiber optic cable as recited in claim 1, further comprising a first buffered optical fiber inserted into at least one first slot.

3. A splicing tray for optical fibers and fiber optic cable as recited in claim 1, further comprising a second buffered optical fiber inserted into at least one second slot.

4. A splicing tray for optical fibers and fiber optic cable as recited in claim 1, further comprising a first buffered optical fiber inserted into at least one first slot and a second buffered optical fiber inserted into at least one second slot.

5. An apparatus for splicing optical fibers comprising:
   (a) a receiving means;
   (b) two upstanding sidewalls mounted on a face of said receiving means forming a slot between said two upstanding sidewalls, said slot having first and second levels in communication with each other wherein
      (i) the first level within said slot has its longitudinal opening within the inward portion of the second level within said slot;
      (ii) the first level within said slot is narrower than the second level within said slot in the direction transverse to the upstanding sidewalls forming said slot; and
   (c) a first buffered optical fiber received between the portion of said sidewalls forming the first level of said slot.

6. An apparatus for splicing optical fibers as recited in claim 5, wherein each of said two upstanding sidewalls extend the length of said face of said receiving means.

7. An apparatus for splicing optical fibers as recited in claim 5, further comprising a second buffered optical fiber received between the portion of said sidewalls forming the second level of said slot.

* * * * *